May 29, 1951 C. A. DE GIERS 2,554,978
EXPLOSION PROOF ELECTRICAL INDICATOR
Filed Feb. 14, 1947 2 Sheets-Sheet 1

INVENTOR.
CLARENCE A. DE GIERS
BY
Robert S. Dunham
ATTORNEY

May 29, 1951  C. A. DE GIERS  2,554,978
EXPLOSION PROOF ELECTRICAL INDICATOR
Filed Feb. 14, 1947  2 Sheets-Sheet 2

INVENTOR.
CLARENCE A. DE GIERS
BY
Robert S. Dunham
ATTORNEY

Patented May 29, 1951

2,554,978

UNITED STATES PATENT OFFICE 2,554,978

EXPLOSION-PROOF ELECTRICAL INDICATOR

Clarence A. de Giers, Forest Hills, N. Y., assignor to The Liquidometer Corporation, Long Island City, N. Y., a corporation of Delaware Application February 14, 1947, Serial No. 728,409

1 Claim. (Cl. 171—95)

This invention relates to a telemetering device for indicating purposes in which a transmitter controlled by a variable physical magnitude to be supervised, transmits corresponding signals to a receiver system. The invention relates particularly to an indicator used in conjunction with the measurement of an inflammable or hazardous liquid, such as gasoline in a tank.

Indicators of this type may be mounted closely adjacent to a tank containing such liquids. As a result, there is a certain latent danger of an ignition of fuel fumes by electric sparks at the electric components of the indicator. Such fuel fumes are always present to a certain extent, as leakage of vapors from the tank is practically unavoidable, particularly when highly volatile fuel, such as gasoline, is contained in the tank. Furthermore, the presence of fuel fumes tends to corrode the metal parts of the indicator, thereby increasing the possibility of failure.

Accordingly, one of the objects of the invention is to provide means for greatly reducing or even eliminating the danger of explosion by ignition of fuel fumes.

Another object of the invention is to provide means by which electric parts of the indicator are protected against contact with corrosive fuel fumes.

Another object of the invention is to provide an explosion and corrosion proof indicator of the general type above referred to, which is rugged and reliable in operation and relatively inexpensive to manufacture.

In the accompanying drawings, a preferred embodiment of the invention is shown by way of illustration and not by way of limitation.

Figure 1:
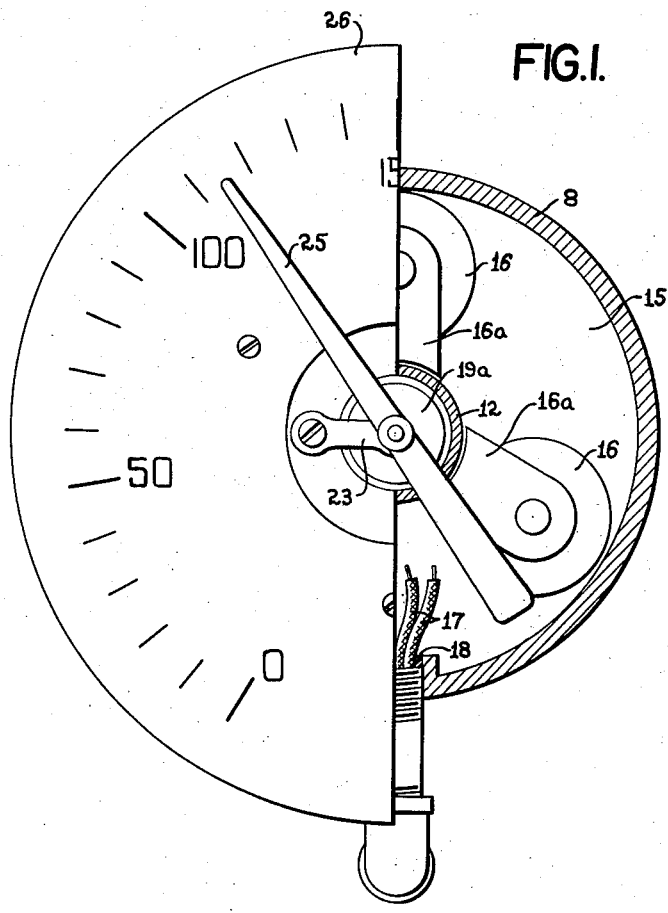
Fig. 1 is a partial front view, half of which shows the internal components of an indicator of the invention on line 1—1 of Fig. 2.

The indicator is enclosed in a cylindrical housing 8 having its rear end enclosed by a head 9 screwed into housing 8 at 10. The front of the housing is closed by an integral annular head 11 which extends radially outwardly to support a dial and other parts, and radially inwardly to support a rearwardly, and axially, extending tubular indentation 12 having its wall concentric with the outer housing 8 and integrally sealed at its rear end, thus forming an annular hermetically sealed chamber 15 between the outer housing 8 and indentation 12. The electrical equipment is all contained in chamber 15.

Figure 2:
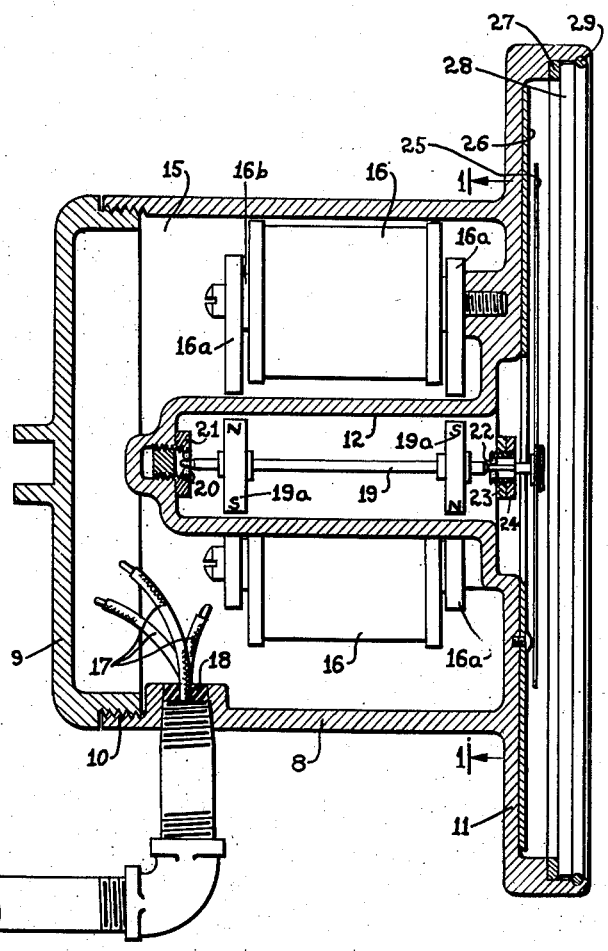
Fig. 2 is a vertical sectional view of the indicator shown on Fig. 1.

Inside chamber 15 are mounted the electrical components of the instrument. For example, there may be provided three coils 16, two of which are seen in Figs. 1 and 2 and all three indicated in Fig. 3. These coils are wound on cores 16b of high permeability magnetic material and have pole shoes 16a at both ends, shaped to fit the curvature of inner wall 12 as best seen from Fig. 1. Connections to the coils and other associated components are made through wires 17 brought out through fittings hermetically sealed to the housing by pitch or other suitable packing 18.

The general construction of the indicating elements are described in a co-pending application of Osterlund and Geiser, Ser. No. 718,144, filed December 24, 1946, Electric Measuring Device with Torque Amplification, now Patent No. 2,486,972, issued November 1, 1949. Cooperating with the magnetic field produced by coils 16 through pole shoes 16a is a rotor made up of shaft 19 and two rotor sections 19a of high coercive force magnetic material such as Alnico and arranged so that they align themselves in the plane of the pole shoes 16a through wall 12, which is in the form of a deep indentation in housing 8. The rotor assembly is supported at the rear by a jewel bearing 20 mounted in the end of the cup and locked in place by a locknut 21. At the front end, the rotor assembly is supported by jewel bearing 22 mounted on a bridge 23 (Fig. 1). A locknut 24 is used to keep the jewel nut in place.

The rotor assembly carries pointer 25 movable over dial 26. The dial and rotor assembly are protected by conventional means such as a gasket 27, glass 28 and snap ring 29.

Figure 3:
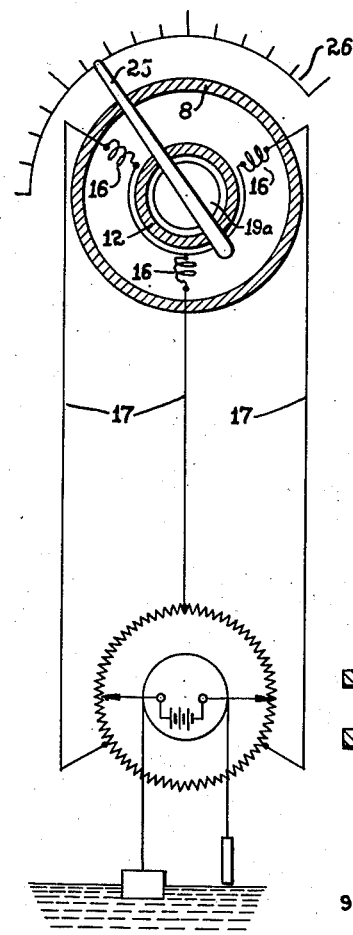
Fig. 3 is a typical wiring diagram showing schematically the electrical components of the indicator.

In operation, a transmitter such as shown schematically in Fig. 3 varies the magnetic field of the indicator coils, and as is well known in the art the rotor follows this field to give an indication of the transmitter position. Such an indicator may be operated with a relatively large air gap between the pole piece and the rotor, hence a substantial wall of material having essentially unity permeability may be introduced to provide the explosion proof feature.

The invention is illustrated and described with two spaced-apart magnetic discs 19a and with coils 16 each having a shoe 16a at each of its ends. While this is the preferred form of the invention, it is also possible to use coils with radial axes and with an outer magnetic return path. In that case only a single disc would be used and the coils would have shoes only on their inner ends.

As set forth more in detail in the said copending application of Osterlund et al., Ser. No. 718,144, the magnetic discs 19a, shown in Fig. 2, are both permanent magnets and are so arranged as to have opposite polarity, i. e. the north pole of one is in the same radial direction from the axis of the rotor shaft 19 as the south pole of the other, and vice versa. These permanent magnetic discs 19a are axially aligned with the several pole pieces 16a of the three electro-magnets or deflecting coils 16 as shown. Then as the housing 8 and particularly the reentrant portion 12 thereof is of non-magnetic material, the flux generated by the coils 16 and passing from the pole pieces 16a to and through the magnetic discs 19a will pass through the wall of the reentrant portion 12, so as to control the position of the rotor in response to the resultant direction of magnetic flux of the three coils 16. While three such coils are shown in the drawings, many telemetering system circuits are known wherein but two deflecting coils are employed. The principles of this invention may be equally well applied to such systems, the important features being that the rotatable elements are sealed away from the electrical means by which the position of the rotor is controlled. Furthermore, it is necessary that the reentrant portion 12 of the housing be of non-magnetic material, for the reason that if this were of magnetic material, the flux would by-pass the rotor magnets and would have a clear path around these magnets through the housing portion. This would obviously defeat the intended purpose of the device, at least to a substantial and undesired extent.

In the invention all the electrical components are mounted in a sealed chamber. Should a spark arise from any cause within said chamber no explosion would result since any inflammable fumes are excluded from the chamber. Since none of the electrical parts are exposed to dangerous fumes, this further protects these components from corrosion. If necessary, the chamber could either be evacuated or filled with an inert gas.

It is to be understood that the invention is not limited to the specific embodiment herein illustrated and described but may be used in other ways without departure from its spirit as defined by the following claim.

What is claimed is:

An electrical measuring instrument of the ratiometer type, comprising a substantially cylindrical housing of non-magnetic material having its front end closed by an integral annular head, an imperforate reentrant, substantially cylindrical, cup shaped portion integral with said head and located substantially concentric with said cylindrical housing, a rotor assembly mounted concentrically of and within said cup shaped portion and arranged for free rotation in respect thereto, said rotor assembly including an arbor and two magnetic members mounted thereon in axially spaced relation, at least one of said members being permanently magnetized in a direction transverse of the axis of said arbor, a plurality of stationary deflecting coils each mounted on said annular head and all disposed in the annular space between said cylindrical housing and said cup shaped portion and at substantially uniform distances from said rotor assembly with the axes of said coils substantially parallel with the axis of said arbor, a magnetic core for each of said coils, pole pieces of magnetic material in contact with each end of each said core and extending therefrom substantially radially inwardly toward the axis of said arbor, said members being located on said arbor in substantially radial alignment with said pole pieces, whereby to form magnetic circuits closed substantially through said magnetic members, said pole pieces and said cores; and means for preventing passage into contact with said coils of combustible and corrosive gases to prevent corrosion of said coils and explosion of said gases, including a cap member threaded to said cylindrical housing, an aperture in said cylindrical housing for the through passage of electrical leads for said coils, and hermetic sealing material in said aperture about said electrical leads, so that said coils are enclosed in a sealed housing during normal operation of the instrument, while access to the interior of the instrument may be obtained by unscrewing said cap member from said cylindrical housing.

CLARENCE A. DE GIERS.

REFERENCES CITED

The following references are of record in the file of this patent:

UNITED STATES PATENTS

| Number | Name | Date |
| --- | --- | --- |
| 383,444 | Crompton et al. | May 29, 1888 |
| 604,687 | Moore | May 24, 1898 |
| 1,248,246 | Beede | Nov. 27, 1917 |
| 2,003,163 | Warren | May 28, 1935 |
| 2,320,946 | Madden | June 1, 1943 |
| 2,372,002 | Kelley | Mar. 20, 1945 |